June 14, 1949.  L. N. RIDENOUR  2,473,175
RADIO-DIRECTION-FINDING SYSTEM
Filed Dec. 30, 1943  3 Sheets-Sheet 3
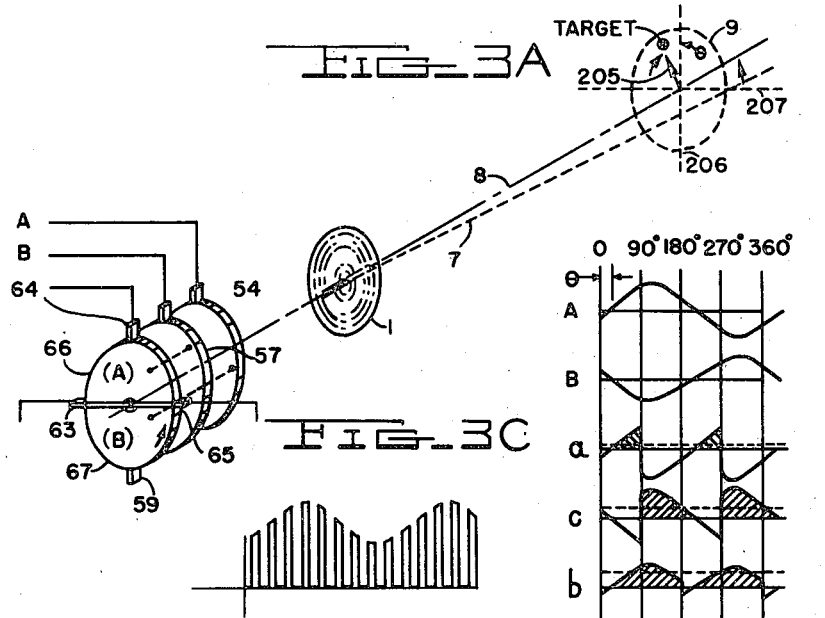
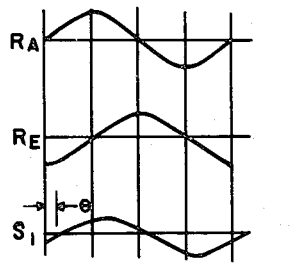
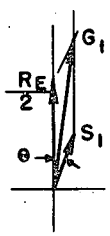
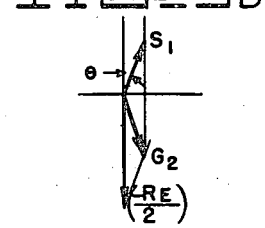
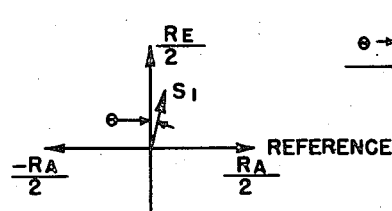
Inventor
LOUIS N. RIDENOUR
By J. J. Fitzgerald
Attorney Patented June 14, 1949

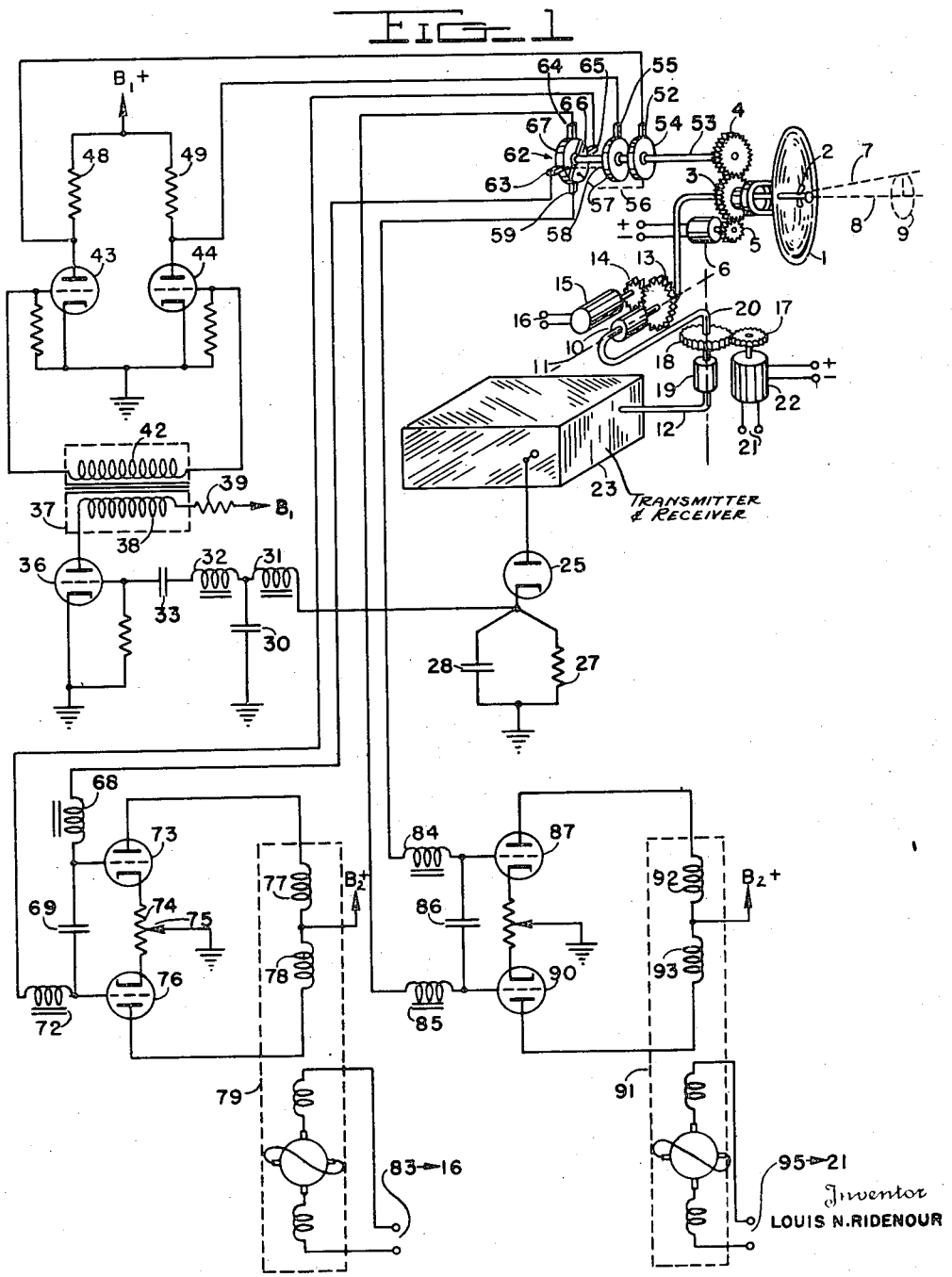

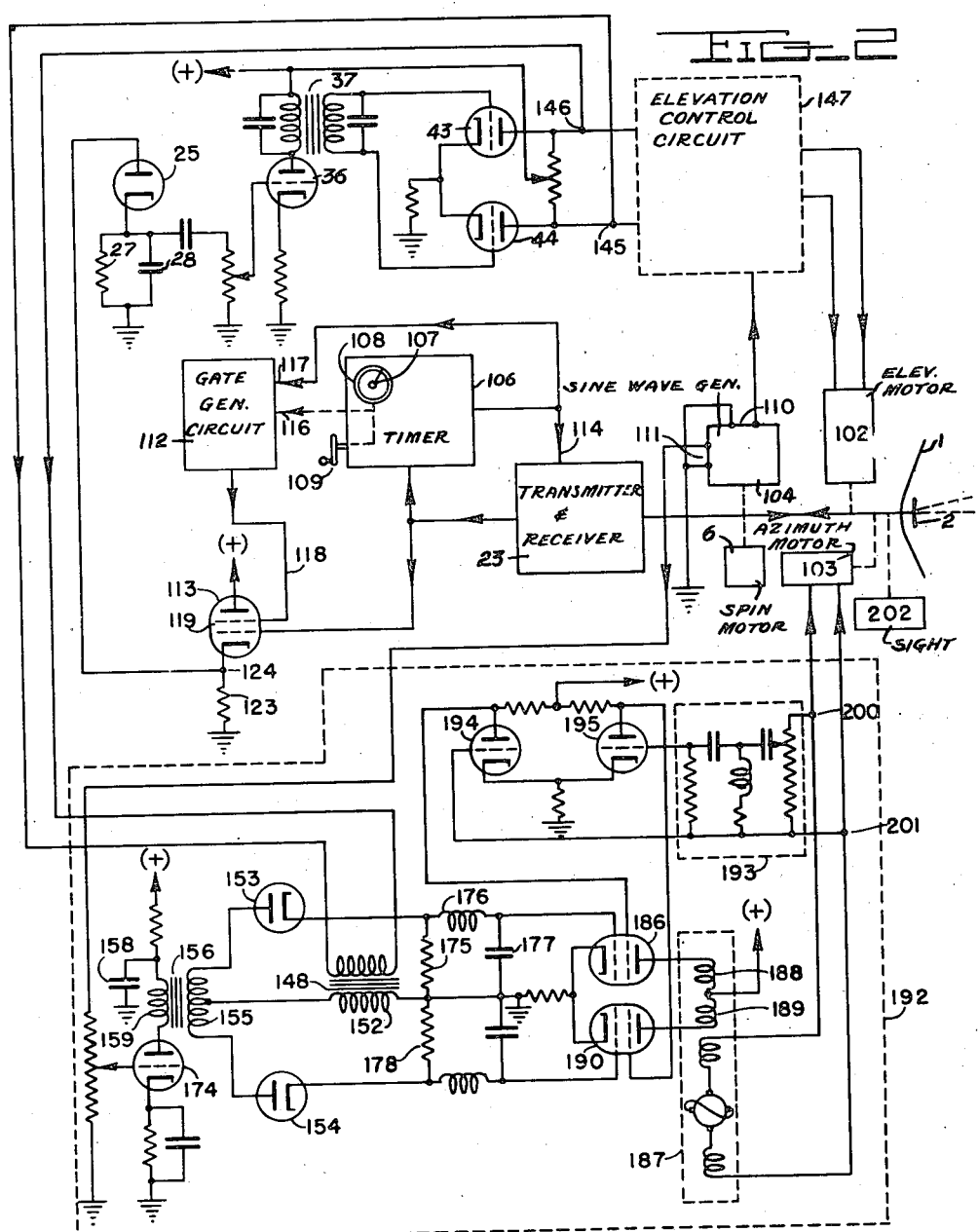

2,473,175

UNITED STATES PATENT OFFICE 2,473,175

RADIO DIRECTION-FINDING SYSTEM

Louis N. Ridenour, Philadelphia, Pa., assignor, by mesne assignments, to the United States of America as represented by the Secretary of the Navy Application December 30, 1943, Serial No. 516,299

17 Claims. (Cl. 343—7)

The present invention relates to improvement in radio detection apparatus and especially to the direction finding characteristics thereof. In particular, it relates to radio detection apparatus adapted for automatic orientation towards remote objects.

An object of the invention is to provide radio detection apparatus having a directive antenna and means adapted automatically to cause said antenna to seek and maintain an orientation related to the direction of pointing to a remote object.

Another object of the invention is to provide a radio detection apparatus having means to directively radiate a beam of electromagnetic energy and means to angularly scan said beam in a predetermined cyclic manner about a selected field of space and to utilize the characteristics of the energy reflected from an object in said field and the phase position of said beam in said cyclic motion when said reflected energy is received to cause the mean axis of directivity of said radiating means to be directed toward said object.

A more specific object is to provide a transmitting and receiving device and means to angularly and cyclically scan a directively radiated beam of electromagnetic energy about an axis and about a selected field in space and to provide means to compare the time phase characteristics of the envelope of received waves reflected from an object in said field with the time phase variation of said cyclic scan and to produce error voltages from said comparison adapted to drive servomotor means in such a manner as to cause said axis to be driven toward alignment with the direction to said object.

A further object is to provide such a system as previously set forth additionally adapted to select and maintain its orientation toward one of a number of objects included and differently disposed in range in the field of scan through which the beam of electromagnetic energy moves.

Other particular and more restricted aims and designs of the invention will best be understood from the description of the accompanying drawings in which:

Fig. 1 is a partially schematic circuit diagram of a fundamental embodiment of the present invention;

Fig. 2 is a circuit diagram illustrating certain modifications of the apparatus of Fig. 1;

Fig. 3A is an enlarged view of a portion of Fig. 1;

Fig. 3B and Fig. 3C are time graphs of certain voltages that appear in the operation of the circuit of Fig. 1;

Fig. 4A is a time graph of certain voltages that appear in the operation of the circuit of Fig. 2; and Figs. 4B to 4F are vector diagrams which explain the operation of the apparatus of Fig. 2.

In the embodiment of Fig. 1, I have shown a form of directive antenna system which may be used in my invention. Such a form may comprise a parabolic reflecting surface and a radiating means which is located in the vicinity of the focal region of the parabolic surface. When this reflecting surface is illuminated by the radiating means with ultra-short-wave electromagnetic energy a directive beam of radiation is obtained, approximately circular in cross section with the maximum intensity region being at the center thereof, and having a divergence angle which may be in the order of 10 degrees. The axis of the beam of radiation will be approximately coincident with the axis of the parabolic surface.

The present invention is best adapted to utilize "conical scan," so called, whereby a directive beam, such as that previously described, is rotated about a given axis of orientation with the beam axis inclined to the axis of orientation at an acute angle. The geometrical concept of such a type of scan may be understood in full detail by referring to the patent of Wilhelm Runge, No. 2,083,242 and entitled "Method of direction finding." By directing the axis of rotation of a conically scanning antenna toward the vicinity of an isolated target, said target being a source of electromagnetic radiation reflected or transmitted therefrom, electromagnetic waves will be received which, although radiated originally with a substantially constant amplitude, have approximately sinusoidal amplitude modulation, if the target is not positioned along the axis of rotation of the beam. Clearly, the received energy from such an object will be maximum when, during a cycle of rotation, the "beam axis" of the antenna comes nearest to alignment with said object.

My invention is directed toward utilizing certain characteristics of this modulation of the received energy to produce error voltages of the proper sense and magnitude which will operate automatic control devices to the end of causing the axis of rotation, or orientation axis, of the conically scanning antenna to automatically seek alignment with the direction of pointing to a remote object. Misalignment therefore results in appropriate error voltages which work to restore alignment automatically in the system.

In Fig. 1, axis 8 represents the axis about which the beam may be rotated, while axis 7 represents the beam axis. The beam axis, as I have preferred to call it, is the direction along which electromagnetic waves must propagate to have maximum effect from or on the antenna. Radiator 2 may be of the dipole and reflector type, whereby the dipole radiation is directed almost completely against parabolic surface 1 to produce the beam in the manner mentioned. For the case shown, the radiator is maintained stationary in the focal region of the paraboloid 1 and the paraboloid is positioned such that axis 7 of the paraboloid 1 makes an acute angle with axis 8, the orientation axis of the system. Thus tilted, the paraboloid is rotated about axis 8 such that a point on axis 7 describes the circular path 9 as shown in Fig. 1. Gear 5 is connected to the shaft of motor 6 and drives gear 3 which in turn is connected to rotate parabolic reflector 1. Motor 6 may be referred to as the "spin" motor and axis 8 as the "spin" axis, or the orientation axis of the antenna.

It will be clear that rapid conical scanning may be achieved in a variety of ways and with a variety of antenna arrangements but the way I have illustrated is especially satisfactory since it permits of constant polarization characteristics for the radiated beam of electromagnetic energy. That is, assuming that the dipole radiator is oriented vertically, the electromagnetic radiation will have vertical polarization constantly throughout the scan cycle. Constantly oriented polarization is not essential but is desirable since, as may be more clearly seen subsequently, it does not introduce an extra modulation into the received energy, which would ordinarily occur with the plane of polarization of the antenna rotating in conical scanning.

In some instances I may prefer to maintain the parabolic reflector stationary and revolve the dipole radiatior for producing conical scan. In such a case the dipole may be spun about the reflector axis but slightly displaced therefrom and in the focal region of the reflector. The plane of polarization in this case may pass through two complete cycles of direction change for each revolution of the radiator, and echo signals reflected from an unsymmetrical target will be modulated at a frequency twice that of the scan frequency. Substantially all targets encountered do not have spherical reflecting symmetry but reflect greater amounts of energy having one direction of polarization than that of other directions of polarization. Although in the embodiment of Fig. 1, the effect of the double frequency modulation, if such modulation exists, is inherently eliminated, the embodiment of Fig. 2 may be provided with a special filter to eliminate such double frequency modulation from the automatic tracking circuits, such that they are not affected by it. This will be further discussed at a later point.

Referring to Fig. 1, unit 23 is intended to represent transmitter and receiver apparatus of a radio detection system. Such a system may be of the type adapted to radiate and receive a succession of pulses of ultra-high-frequency energy and at high power levels. As indicated, the transmitting and receiving functions may be performed by a single antenna and to this end a special transmit-receive switch is provided which prevents energy generated by the ultra-high-frequency generator in the transmitter from reaching the receiver, and yet allows nearly all of the received energy to be conducted to the receiver. Special switches of this type are known to the art and further discussion is believed unnecessary in the present application.

Coaxial transmission line 12 connects the antenna with unit 23. I have preferred to mount unit 23 in a stationary position and to make this possible and to permit the antenna orientation axis to be moved both horizontally and vertically coaxial line 12 may have a configuration after the manner shown in Fig. 1. Rotatable joint 10 permits the antenna and certain other related components to move in elevation angle, while rotatable joint 19 permits rotation in horizontal, or azimuth angle.

Shaft 53, through gears 4 and 3, is caused to rotate at the same angular speed as is reflector 1. Mounted on shaft 53 and turning with it are two slip rings, 54 and 57, having brushes 52 and 55 respectively. Also on shaft 53 is a two-segment commutator 62 having four brushes arranged in quadrature. These brushes are 59, 63, 64 and 65. Brushes 59 and 64 may be disposed diametrically opposite each other on the commutator comprising segments 66 and 67, and may be aligned in a vertical plane. Brushes 63 and 65 may be similarly arranged but aligned in a horizontal plane. Segment 66 of commutator 62 is electrically connected to slip ring 54 as indicated by dotted line 56, while segment 67 is so connected to slip ring 57 as shown by dotted line 58.

Motor 15, having armature terminals 16 is connected to turn gear 13 through gear 14, the latter being mounted on the motor shaft. The entire upper portion of the mechanical apparatus, including shaft 53, motor 6, the antenna device and the section of coaxial line 12 between antenna and rotatable joint 10 may be mounted in such a manner as to permit motor 16 to move such upper portion in elevation angle about the horizontal axis 11.

Motor 22 having armature terminals 21, may be designated as the azimuthal drive motor and is connected through gears 17 and 18 to turn the above included apparatus, motor 16, and the section of coaxial line between the rotatable joint in azimuth angle about the vertical axis 20.

Fig. 3A diagrammatically indicates a preferred arrangement of the commutator components relative to the beam axis and the orientation axis. It will be understood that the slit between commutator segments may be vertical or at any other angle providing the azimuth brushes (here referred to as 63 and 65) are aligned therewith when the beam axis 7 is at its greatest horizontal displacement on either side of its excursion during conical scan. This sort of modification is so elementary and the invention is so fundamental that numerous modifications may be made without departing from the principles involved. I have attempted to use the simplest arrangements possible throughout the description of the apparatus to facilitate an understanding of the operation thereof.

Axis 8 is the axis of revolution of the beam, and I have called it the orientation axis of the antenna, while dotted line 9 indicates the path a point on the beam axis 7 may describe in its cyclic motion, as previously mentioned. The line 205 shows the average direction the drive motors 15 and 22 must move the orientation axis 8 to reduce the error of pointing of the system such that the axis 8 will be aligned with the target. The beam axis 7 is shown, in Fig. 3A, in a position which will be referred to as the reference position in subsequent description and vector diagrams relating to the operation of the apparatus.

Again referring to Fig. 1, diode 25, condenser 26, and resistor 27 are connected in a detecting circuit of the peak-following type in which the voltage across condenser 26 substantially becomes the envelope of the waves rectified by diode 25, which are here the waves at the receiver output as produced from the electromagnetic energy propagated and received from a remote reflecting object or target. With the system transmitting and receiving short pulses of wave energy, this detector should have an RC time constant which is long compared to the time interval between successive pulses transmitted. Fig. 3C illustrates the approximate form of the series of pulses appearing at the output of the receiver video stages and applied to the detector. The condenser voltage will vary substantially as the peak envelope of these pulses.

The electromagnetic radiation received from a remote object may be of the continuous wave type, and in this case the detector will simply provide a voltage proportional to the envelope of the waves so received.

Since the modulation of the received waves, or detected signals, is only approximately of a sinusoidal nature filtering circuits may be provided to obtain the fundamental sinusoidal component of the modulation signal voltage. Such a circuit may be as shown in Fig. 1 and comprise inductances 31 and 32 and condenser 30. This filter may be designed to prevent substantially all components of voltage variations having frequency above the fundamental component of the detected signal from reaching the grid of amplifier tube 36. The anode terminal of tube 36 may be connected to one side of the primary winding 38 of transformer 37, the other side of said winding being connected through voltage-dropping resistor 39 to a suitable source of positive potential such as at $B_1$. The cathode of tube 36 may be grounded as may be the juncture of resistor 27 and condenser 28 opposite diode 25. Secondary winding 42 of transformer 37 may be connected in a push-pull amplifier circuit comprising tubes 43 and 44, the two terminals of this winding being connected respectively to the control grids of these amplifier tubes. The anode terminals of the tubes 43 and 44 may be connected to a suitable source of positive potential through plate load resistors 48 and 49. Two sinusoidal voltages, representing the amplified fundamental component of the detected signals, appear at these anode terminals and are 180 degrees out of phase with respect to each other. These sine waves are applied to brushes 55 and 52 of slip rings 57 and 54 respectively and thence to segments 67 and 66 of commutator 62.

Brushes 59 and 64 are connected to the control grids of amplifier tubes 87 and 90 while brushes 63 and 65 are connected to the control grids of amplifier tubes 73 and 76 respectively, and the amplified signal voltages are applied to these grids in a manner dependent upon the characteristics of the modulation envelope of waves received by the system and according to the commutation by commutator 62. The last mentioned amplifier tubes may serve as driving stages for suitable power amplifying means preliminary to obtaining voltages for driving the azimuthal and elevational motors.

A power amplifying arrangement suited to the purpose, and one which I have found preferable utilizes an electromechanical generator such as one of the "amplidyne" type, whereby a small amount of field current in the "amplidyne" controls a relatively large amount of power obtainable at the armature terminals thereof. I consider it desirable to connect the "amplidyne" control field into the control circuit by splitting the control field of the azimuth and elevation "amplidynes" into two equal sections and balancing the currents in the two sections such that their effect in producing field flux in the "amplidynes" is zero when the currents are equal in the two portions of each field winding, which occurs when the detected modulation signal is zero. When a modulation or error signal causes an unbalance in the currents through the two sections of each field winding, the output voltages from each "amplidyne" responds in a predetermined manner.

In the figure, the output of "amplidyne" 79 controls motor 15 (as indicated by the terminal reference numbers) and the output of "amplidyne" 91 controls motor 22. The plate current of tube 73 flows through half-winding 77 while that of tube 76 flows through half-winding 78 of "amplidyne" 79. A similar arrangement is made with tubes 87 and 90 and "amplidyne" 91. The cathode of tubes 73 and 76 are connected together through resistor 74, the latter having an adjustable contactor 75 which may be grounded. This contactor may be set approximately at the mid-point of resistor 74 and is provided to adjust a balance in the plate circuits of tubes 73 and 76 such that there will be no tendency of motors 15 to turn when the error in elevation of the antenna orientation is zero. A similar arrangement may be made for the amplifying circuit comprising tubes 87 and 90.

Chokes 68, 72, 84 and 85, and condensers 69 and 96 may be arranged in the circuit as indicated to provide further filtering action and the voltages across these condensers will appear respectively between the control grids of the pairs of tubes 73 and 76, and 87 and 90. Should tube 73 have an average conduction throughout a cycle greater than that of tube 76, for example, the "amplidyne" generator field currents will be unbalanced by a certain amount resulting in the generation and application of a voltage to the elevation drive motor of such magnitude and sense as to cause a rebalance of the field currents in "amplidyne" 79 by repositioning the antenna axis properly to reduce the modulation error signal. The polarities of connections throughout are such as to automatically and continuously position the antenna orientation to reduce error signals, whereby the antenna orientation follows the direction of pointing to a remote reflecting object.

Fig. 3A may be referred to in the functional operation of the apparatus. As tilted parabolic reflector 1 revolves about the axis of antenna orientation 8 the beam of electromagnetic energy having axis 7 likewise rotates, axis 7 becoming the generatrix of the conical surface. For generality, a target will be assumed to lie along the direction of line 205, displaced an angle $\theta$ clockwise from the vertical line 206. As the beam of radiation sweeps at a constant rate around its predetermined circular path the reflections from a selected target picked up by the receiving apparatus will be intensity modulated, and will vary from a maximum, when beam axis 7 intersects the line 205 which passes through axis 8 and the target, to a minimum when said beam axis 7 is exactly opposite its angular position for maximum intensity of modulation.

With a pulsed transmitter the video output of the receiving apparatus may thus appear approximately as in Fig. 3C, with the modulation varying cyclically at the frequency of rotation of the conically scanning beam. In Fig. 3B the voltage-angular displacement graphs represent the voltages produced by detecting, filtering and amplifying the envelope of pulses appearing in Fig. 3C. These graphs are illustrated by one cycle of revolution of the beam where the voltages are those appearing at the commutator brushes, and the angular displacement refers to the clockwise displacement angle of axis 7. The zero angular displacement position may correspond to the reference position of the beam axis as previously specified.

Graphs, a, b, c, and d of Fig. 3B indicate the voltages at brushes 64, 63, 59 and 65 respectively, during one cycle of rotation of the beam. Since the commutator brushes 64, 63, 59 and 65 are connected respectively to the grids of tubes 90, 73, 87 and 76 these tubes will conduct approximately during the portions of each cycle of the voltages as indicated by the shading in the graphs, since the voltages are positive during these portions. The effect of the currents in the pair of vacuum tubes directly connected to the vertically aligned brushes and along with the pair connected to horizontally aligned brushes, oppose each other in their effect on the respective "amplidyne" fields, as in the manner heretofore mentioned. It is clear that the current flowing in the tube having the grid voltage corresponding to plot c is greater than the current flowing in the tube having grid voltage a, similarly, but accentuated in the effect, for the respective grid voltages d and b with the other pair of tubes in this case. When axis 8, the orientation axis of the antenna, intersects the center of reflection of the target there will be zero modulation of the envelope of received signals and the plate currents in the tubes of each pair of amplifier tubes connected to the "amplidyne" field windings will be balanced, and there will be no tendency for the azimuthal and elevational drive motors to move the antenna orientation axis.

An object, or target, in the field of scan of the electromagnetic beam may actuate the apparatus into orienting the antenna towards this object. If the object is inside the cone described by the axis of the conically scanning beam the error or correcting signal will be approximately proportional to the angular displacement of the object from the antenna orientation axis. This produces an advantageous tracking characteristic in the apparatus since fast moving objects might conceivably be lost to the apparatus were not this present. If the object is outside the cone mentioned, but still close enough thereto that appreciable energy is received from the target an error modulation signal will still be produced and the apparatus will act to reduce the signal and correspondingly move the orientation axis of the antenna towards the object, but the error signal will fall off in intensity as the displacement of the object from the orientation axis increases beyond the cone region. It is therefore clearly desirable to provide means to direct the antenna orientation axis towards the desired object initially such that the most favorable operating characteristics of the apparatus may be utilized.

One method which I have found desirable for initially directing the antenna orientation towards an object employs an optical sight geared to the antenna mount such that antenna and optical sight orientation coincide. Since such an arrangement is perfectly straight-forward I have merely shown the sight as block 202 in Fig. 2. By directing the sight initially towards a selected target the apparatus is caused thereafter to follow that target in direction of pointing. The field windings of the antenna orientation drive motors may be deenergized during the time of use of the sight by means of suitable switching apparatus, to prevent these motors from working against the movement of the sight, or, alternatively, the receiving apparatus in unit 105 may be merely "switched off" during the use of the sight.

Although the embodiment of Fig. 1 may be used to carry out certain objects of the invention, the scope of the invention is by no means limited to the particular arrangement shown. For instance, one conceivable arrangement might be such that the target or the object to which the antenna axis is to be oriented towards might be a transmitting antenna which operates at a wave length equal to the wave length to which the receiver of my apparatus is tuned. Or, a separate transmitting system may be used whereby a reflecting object in space is illuminated by radiations from this transmitter and the conical scanning antenna in my invention may be part of a receiving system which picks up the energy reflecting from said object according to the arrangement of the system. In Fig. 1, of course, the transmitting and receiving apparatus are located together and the antenna performs both the transmitting and receiving functions. The transmitters may be either a continuous wave type, in which the oscillations are of constant amplitude, essentially, or it may operate to generate a succession of discrete pulses of electromagnetic energy.

The embodiment of Fig. 1 is a rather fundamental one and may therefore assume a number of modifications and changes without departing from the principles involved. For instance, I may desire to modify, and possibly refine, certain features of this embodiment and provide a somewhat more complicated variation thereof, as that shown in Fig. 2.

Before commencing a detailed description of the apparatus in Fig. 2, several of the desired refinements to the apparatus of Fig. 1 which may be considered improvements in the apparatus will be briefly discussed.

Among these features is one which I have called "range discrimination." Suppose there are a number of potential targets in the field of motion of the conically scanning beam of the system, and it is desired to cause my system to automatically follow a selected one of these targets. Clearly, all of the targets may reflect radiations and the phase and intensity of the modulation of the received energy produced by these various targets would utterly confuse the operation of my automatic tracking circuit were it not for range discrimination. This feature makes it possible and feasible to select one among a number of targets and follow its position, discriminating against all others, assuming the selected target is differently disposed in range from all of the other targets. This I have accomplished by providing means to prevent echo pulses from all but the selected target from reaching the control apparatus of my system, and feasibility of this arrangement requires the use of pulsed echo detection systems.

In a pulsed detection apparatus adapted for range measurement, the time interval between the transmission of a given pulse of electromagnetic energy and the reception of the echo pulse from a remote reflecting object is a measure of range. Range discrimination may be obtained by repeatedly generating a sensitizing gate signal, or rectangular pulse of voltage, during the time of receipt of each echo signal from the selected target. This gate voltage may be adjustable in "range position" and may be applied to a sensitizing means, or electronic switch associated with the receiver. The time-phase, or "range position" of this gate voltage may be adjusted to allow only the selected echo pulse to pass to the control circuits. At all other times the electronic switch may be biased sufficiently to prevent the passage of other echo signals from undesired targets.

In Fig. 2 I have designated such an electronic switch device as a cathode follower comprising tube 113 and resistor 123. Tube 113 may have at least two control grids and one of these grids may be connected to the gate generating circuit and the other grid to the output of the system receiver. The output terminal of the cathode follower is indicated at point 124 and a signal will appear at this point only if the gate voltage pulse appears at tube 113 at the same time as a received signal from the receiver output. Unit 108 is a range measuring and target display apparatus, and may contain cathode ray tube indicator 108 which may indicate the range disposition of targets in the field of scan of the system antenna, by means of a circular-sweep type of data presentation. By turning hand wheel 109 the operator rotates the fiducial marker 107 adjacent the face of cathode ray tube 108 and he may select one among a number of target signals by aligning this marker with a selected target representation, and in so doing, he automatically controls the "range position" of the gate voltage which is applied to tube 113. The range discrimination portion of the apparatus will be discussed in somewhat more detail at a later point.

Although but one purpose of range discrimination has been mentioned, there is another reason for desiring it, namely that of keeping all receiver noise out of the direction-balance circuit except that which unavoidably accompanies each reflected pulse from the selected target.

Another modification which I may prefer to apply to the automatic tracking apparatus embodied in my invention is related to comparing the phase of the modulation envelope of received signals with the phase of the cyclically scanning antenna. In other words, it relates to the fact that by measuring the point in the cycle of beam rotation at which the modulation envelope of received waves is a positive maximum, the sense of the angular error in the orientation of the directive antenna device will be known. In Fig. 1, I have illustrated a mechanical commutation device for performing this phase comparison or measurement function and in Fig. 2 I have illustrated a means to measure this phase relation entirely with electronic apparatus. In fact, complete electronic control of the apparatus may be desirable over that using mechanical commutation.

Another provision which I have shown in Fig. 2, and not in Fig. 1, and one which may assume a variety of forms, is a damping arrangement adapted to provide an "anti-hunt" characteristic to the system to prevent the antenna device from "hunting" or oscillating about the correct pointing position.

It will be understood, in the appended claims and in this specification, that when the axis of directivity or axis of maximum response of the antenna is referred to what is meant is the axis of maximum effect of beam intensity of the antenna; while, when the orientation axis of the antenna is referred to what is meant is the axis about which the axis of directivity of the antenna is rotated in the scanning function.

In Fig. 2, for brevity, I have indicated the mechanical features of the antenna device and associated drive motors, etc., symbolically, and the apparatus may be similar in many respects to that of Fig. 1. Unit 103 represents the azimuthal drive mechanism including the motor, while unit 102 represents the elevational drive mechanism. Unit 6 may represent the "spin" motor which is adapted to rotate reflector 1. Unit 104 may represent a two-phase sine wave reference generator, having an armature which rotates with the reflector 1, and which is adapted to generate two sine waves mutually 90° out of phase, one appearing between terminals 110 (vertical reference sine wave) and the other appearing between terminals 111 (horizontal reference sine wave). Unit 202 may represent, as previously described, an optical sight arrangement which is geared to move the antenna orientation in elevation and azimuth angle.

In the device of Fig. 2, it will be assumed that the transmitter and receiver apparatus are adapted for pulsed radio-echo-detection operation, and that unit 23 represents the receiver, modulator, and transmitter of such apparatus. The antenna functions both for receiving and transmitting the high frequency energy and radiator 2 may be connected to unit 23. The timing of transmitted pulses may be controlled by unit 106. Unit 112 may include a gate signal generating circuit for the range discriminating feature of the system and the phasing of this gate may be adjusted by hand wheel 109, as previously described. By adjusting marker 107 to coincide with a selected target signal on the screen of a cathode ray tube 108, the time-phase, or range position, of the sensitizing gate signal which is applied to the tube 113 is automatically adjusted to allow only the pulses reflected from that selected target to pass from the receiver through electronic switch tube 113. The method of synchronizing the modulator by trigger signals from unit 106 and of generating a narrow (range discriminating) gate in unit 112 controlled in time-phase by hand wheel 109 is briefly as follows: Tube 113 is normally biased such that signals from receiver 23 will not appear at point 124, the output of this tube, and that the range discriminating gate from unit 112 may be adjusted in time-phase such that only the selected target signal will be allowed to appear at point 124 in each pulse cycle. Normally, the transmitted pulses from the system are of one or two microseconds time-duration and I will preferably adjust the narrow gate phasing and length such that the start of each gate will occur just before the receipt of the selected echo signal from a remote object while the termination will occur just after the receipt of said echo signal. This tolerance will allow for any minor discrepancies in the accuracy of the range measuring apparatus, and may of course be of greater or lesser duration according to the design of the apparatus and as desired.

The detector comprising diode 25, resistance 27, and condenser 28, may be of the type encountered in Fig. 1 while the amplifier stage comprising tube 36 and the transformer 37 may drive a push-pull amplifier circuit as before. In cases where I employ an antenna device having a rotating plane of polarization, I may prefer to tune the windings of this transformer to eliminate or filter the resulting double-frequency variation, previously mentioned, from the output thereof. Tubes 43 and 44 may be included in this push-pull amplifier circuit and two sinusoidal voltages may be obtained at the anode terminals of these tubes, and will be mutually out of phase and of an amplitude depending upon the relative position of the target with respect to the antenna orientation direction. The operation of the detector, amplifier, and push-pull amplifier, will be clear from the circuit diagram and from the discussion of Fig. 1, and need not be dealt with at this point. The two sinusoidal voltages resulting from modulation of received signals, when a target is displaced from the orientation axis of the system antenna, appearing at points 146 and 145 are applied to the elevational and the azimuthal phase measuring circuits included in units 147 and 192 respectively. The operation of these units will be later discussed.

The azimuth phase measuring and servomotor control circuits are included in unit 192. The corresponding elevational circuits are substantially identical with the azimuthal control circuits and therefore have been indicated simply as unit 147 in the upper right hand corner of Fig. 2. Tubes 194 and 195, along with circuit 193, and similar tubes and circuits in elevational unit 147, comprise an anti-hunt or damping arrangement for the servomotors driving the antenna device, while unit 187 is a power amplifier and may be of the field control type of direct-current generator known as the "amplidyne." The identification and description of remaining components of the control circuits will be later indicated.

The phase measuring circuits which I have adapted for my invention for the azimuth control, may include diode tubes 153 and 154 and transformers 156 and 148, along with other circuit components which will hereinafter be discussed. The function of this phase circuit is to compare the phase relationship of a sine wave of voltage appearing across secondary winding 152 of the transformer 148 with a sinusoidal reference voltage appearing across secondary winding 155 of transformer 156, and to provide direct-current voltages at the control grids of amplifier tubes 186 and 190 which are proportional in sense and in magnitude to the phase difference between these last two mentioned sinusoidal voltages. The reference sine waves from sine wave generator 104 have fixed phase relations with the cyclic rotation of the directed beams from the antenna of the system and are used to determine the error of pointing of the antenna. The output of tube 174 is controlled by the azimuth sine wave reference voltage from unit 104 and is applied to the primary winding 159 of transformer 156. The output of the push-pull amplifier stage comprising tubes 43 and 44 is applied to the primary of transformer 148, and consists of the detected, filtered and amplified modulation envelope of received signals from a remote target. The amplitude of the reference sine wave appearing at the secondary terminals of transformer 156 is substantially constant and the response of the phase circuits to an input signal at transformer 148 depends approximately linearly on the magnitude of the modulation error signal and on the cosine of the phase angle between the comparison sine wave and said signal. When the "sense" of the response of the phase circuit is referred to what is meant is the relative magnitude of the D. C. voltages appearing at the control grids of tubes 186 and 190, i. e., whether one grid is more positive than the other. Similar connections and arrangements are made in the elevational circuits included in unit 147.

In Fig. 4A, the reference voltages and the signal voltage appearing in the phase measuring circuit are illustrated in graphical form. The graph indicated as $R_E$ may represent a plot of the elevational sine wave reference voltage appearing across the primary winding of the reference voltage transformer in the control circuit 147. $R_A$ may represent the azimuthal sine wave reference voltage appearing across the primary winding 159 of reference voltage transformer 156. $S_1$ may represent the amplified signal voltage appearing across winding 152.

In its operation the phase measuring circuit may be considered composed of two sections, one including the upper half of winding 155, tube 153, resistance 175, inductance 176, condenser 177, and winding 152; the other including similar components in the lower portion of the circuit diagram, winding 152 being common to both, of course. The purpose of the inductances and condensers just mentioned is primarily to filter the voltages appearing across resistors 175 and 178 respectively, to provide substantially smooth D. C. voltages at the control grids of amplifying tubes 186 and 190. It will be observed that the average amount of current flowing through rectifier tube 153, for example, will be reflected directly as an average voltage at the control grid of amplifier tube 186. Similarly for the portion of circuit including tube 154.

In the operation of the phase circuit, the relationships may best be observed by representing the sinusoidal voltages vectorially. Fig. 4B is a vector diagram of the voltages appearing in Fig. 4A, observing the standard vector notation with the reference axis as indicated and with phase advance being counterclockwise. The modulated signal is of a phase relation as indicated by the angle $\theta$. Assuming a one to one turn-ratio in transformer 156, one half of $R_A$ will appear across the upper half of secondary winding 155 while an equal voltage, but opposite in sense, will appear across the lower half. Similarly in the elevational circuit. In the series circuit comprising rectifying element 153, resistance 175, winding 152, and the upper half of winding 155, there are two voltages tending to cause current flow, namely the voltages induced in the two windings mentioned. Since these voltages are not necessarily in phase they must be added vectorially, as in Fig. 4E, in which $G_3$ may represent the vector sum of $S_1$ and the voltage across the upper half of secondary winding 155. An average current may thus flow in this portion of the circuit which is substantially proportional to $G_3$, and a voltage drop will appear across resistor 175 accordingly.

One may similarly obtain the vector $G_4$ (Fig. 4F) which is proportional to the voltage appearing across resistor 178. Since both sections of the circuit may be balanced with respect to ground and since amplifier tubes 186 and 190 may be similarly balanced, the voltages G₃ and G₄ applied to the control grids of these tubes will respectively cause proportional plate currents to flow therein. For the phase relationship assumed, with the phase angle θ so chosen, G₃ is obviously larger than G₄ and tube 186 will draw more plate current than will tube 190. An unbalance of currents in windings 188 and 189 of "amplidyne" 187 will accordingly exist and a driving voltage for azimuth motor 103 will be generated, having the appropriate sense and magnitude to move the orientation axis of the antenna until the modulation signal voltage is zero.

A similar method of approach may be utilized in analyzing the operation of the elevational circuits 147. The vector diagrams in Fig. 4C and Fig. 4D illustrate the relations.

To provide damping, or anti-hunt characteristics to the azimuth drive, filter 193 may be connected to the azimuth motor leads as at points 200 and 201. The output of the filter is connected appropriately to differential amplifier tubes 194 and 195 the anode terminals of which, in turn, are connected to the screen grids of tubes 186 and 190 respectively. The filter may have a characteristic such that it passes all frequencies above a certain predetermined frequency and in this way, the differential amplifier control grids will not receive and amplify lower frequencies than said predetermined frequency. The predetermined frequency may be just high enough to include all of the lower frequency components of voltage variations which will occur at the terminals of the azimuth drive motor in normal tracking procedure. Higher frequency voltages are passed through the filter and amplified and inverted in tubes 194 and 195 and applied with a polarity to the screen grids of tubes 186 and 190 such that inverted voltages oppose the undue oscillations. The proper polarity may be one which will cause the correct change of current flow in the "amplidyne" control field windings 188 and 189 such that tendencies of the motor to hunt or oscillate unduly will be damped out. A similar damping arrangement may be located in the elevational circuits 147.

It is believed that the description of my invention is sufficiently clear to leave no doubts as to its underlying principles and inherent advantages. A radio detection apparatus having an antenna adapted to automatically orient itself corresponding to the direction of pointing to a remote object undoubtedly has many advantages and uses. I have chosen to reveal two rather specific forms which the invention may take, but I do not wish to leave an impression suggesting limitations except as in the appended claims.

What I desire to claim and secure by Letters Patent of the United States is:

1. The method of continually determining the range and bearing of a remote object which comprises, producing a directive electromagnetic beam emission at an acute angle to a reference axis, rotating said beam emission about said reference axis, receiving energy reflected from a remote object upon which said beam emission impinges, detecting the modulation wave of said received energy caused whenever said remote object is not concentrically circumscribed by said rotating beam emission, the phase of said modulation wave being characteristic of the position of the remote object relative to said reference axis, producing a reference voltage in accordance with the rotational rate of said beam emission, comparing the phase of the modulation wave of said received energy with the phase of said reference voltage, and moving the orientation of said reference axis to intersect said remote object in response to the difference in phase between said voltages.

2. The method of continually determining the range and bearing of a remote object which comprises, producing a directive electromagnetic beam emission at an acute angle to a reference axis, rotating said beam emission about said reference axis, receiving energy reflected from a remote object upon which said beam emission impinges, detecting the modulation wave of said received energy caused whenever said remote object is not concentrically circumscribed by said beam emission, said modulation wave having a phase, characteristic of the position of the remote object relative to said reference axis, producing a pair of reference voltages in phase quadrature and in accordance with the rotational rate of said beam emission, comparing the phase of the modulation wave of said received energy with each one of said reference voltages, moving the azimuth orientation of said reference axis in response to the difference in phase between one said reference voltage and said modulation wave and moving the elevational orientation of said reference axis in response to the difference in phase between said other reference voltage and the modulation wave.

3. A radio echo detection system, comprising a means producing a directive electromagnetic beam emission at an acute angle to a reference axis, means for receiving energy reflected by a remote object upon which said beam emission impinges, means for rotating said beam emission about said reference axis thereby producing a modulation wave on said received energy whenever said beam emission does not concentrically circumscribe said remote object, means detecting said modulation wave, said modulation wave having a phase, characteristic of the position of the remote object relative to said reference axis, means for producing a reference voltage in accordance with the rotational rate of said beam emission, means comparing the phase of said detected modulation wave with said reference wave, and means moving the orientation of said reference axis to intersect said object in response to the difference in phase between said modulated wave and said reference wave.

4. A radio echo detection system, comprising a means producing a directive electromagnetic beam emission at an acute angle to a reference axis, means receiving energy reflected by a remote object upon which said beam emission impinges, means for rotating said beam emission about said reference axis thereby producing a modulation wave of said received energy whenever said beam emission does not concentrically circumscribe said remote object, the phase of said modulation wave being characteristic of the position of the remote object relative to said reference axis, means detecting said modulation wave, means for producing a pair of reference waves in phase quadrature and in accordance with the rotational rate of said beam emission, means comparing the phase of the modulation wave of said received energy with the phase of each of said reference waves, means moving the azimuth orientation of said reference axis in response to the phase difference between said modulation wave and one of said reference waves, and means moving the elevation orientation of said reference in response to the phase difference between said modulation wave and the other said reference wave.

5. A radio echo detection system, comprising an antenna system having a normal axis of orientation and a beam directive axis at an acute angle to said orientation axis, a means for producing electromagnetic energy coupled to said antenna system, means for receiving energy reflected by a remote object upon which said electromagnetic energy impinges, said last named means being also coupled to said antenna system, means for rotating said beam directive axis about said axis of orientation thereby producing a modulation wave on said received energy whenever said beam axis does not concentrically circumscribe said remote object, means detecting said modulation wave the phase of which is characteristic of the position said remote object occupies relative to said orientation axis, means for producing a reference wave in accordance with the rotation rate of said beam axis, means comparing the phase of said detected modulation wave with said reference wave, and means moving the orientation axis of said antenna in response to the phase difference between said waves.

6. A radio echo detection system, comprising an antenna system having a normal axis of orientation and a beam directive axis at an acute angle to said orientation axis, a means for producing electromagnetic energy coupled to said antenna system, means for receiving energy reflected by a remote object upon which said electromagnetic energy impinges, said last named means being also coupled to said antenna system, means for rotating said beam directive axis about said axis of orientation thereby producing a modulation wave on said received energy whenever said beam axis does not concentrically circumscribe said remote object, means detecting said modulation wave the phase of which is characteristic of the position said remote object occupies relative to said orientation axis, means for producing a pair of reference waves in phase quadrature and in accordance with the rotational rate of said beam axis, means comparing the phase of the detected modulation wave with each of said reference waves, means moving the azimuth orientation of said antenna system in response to the phase difference between one of said reference waves and said modulation wave, and means moving the elevational orientation of said antenna system in response to the difference in phase between the other said reference wave and said modulation wave.

7. A radio echo detection system, comprising a means producing a directive electromagnetic beam emission at an acute angle to a reference axis, means for receiving energy reflected by a remote object upon which said beam emission impinges, means for rotating said beam emission about said reference axis thereby producing a modulation envelope of said received energy whenever said beam emission does not concentrically circumscribe said remote object, means detecting said modulation wave the phase of which is characteristic of the position said object occupies relative to said reference axis, means for producing a reference voltage in accordance with the rotational rate of said beam emission, means comparing the phase of said detected modulation wave with said reference wave, means producing a second voltage determined in sense by the phase difference of said waves, and means moving the orientation of said reference axis in response to the sense of said second voltage.

8. A radio echo detection system, comprising a means producing a directive electromagnetic beam emission at an acute angle to a reference axis, means receiving energy reflected by a remote object upon which said beam emission impinges, means for rotating said beam emission about said reference axis thereby producing a modulation wave of said received energy whenever said beam emission does not concentrically circumscribe said remote object, means detecting said modulation wave the phase of which is characteristic of the position said remote object occupies relative to said reference axis, means producing a pair of reference waves in phase quadrature and in accordance with the rotational rate of said beam emission, means comparing the phase of said modulation wave with each of said reference waves, means producing a second pair of voltages each determined in sense by the phase difference of a respective one of said reference waves and said modulation wave, means moving the azimuth orientation of said reference axis in response to the sense of one of said second pair of voltages, and means moving the elevational orientation of said reference axis in response to the sense of the other said votage of said second pair of voltages.

9. A radio echo detection system, comprising an antenna system having a normal axis of orientation and a beam directive axis at an acute angle to said orientation axis, a means for producing electromagnetic energy coupled to said antenna system, means for receiving energy reflected by a remote object upon which said electromagnetic energy impinges, said last named means also coupled to said antenna system, means for rotating said beam directive axis about said axis of orientation thereby producing a modulation wave on said received energy whenever said beam axis does not concentrically circumscribe said remote object, means detecting said modulation wave the phase of which is characteristic of the position said remote object occupies relative to said orientation axis, means for producing a reference wave in accordance with the rotation rate of said beam axis, means comparing the phase of said detected modulation wave with the phase of said reference wave, means producing a second voltage determined in sense by the phase difference between said reference wave and said modulation wave, and means moving the orientation axis of said antenna to the sense of said second voltage.

10. A radio echo detection system, comprising an antenna system having an axis of orientation and an axis of beam directivity, said axis of beam directivity being situated to form an acute angle to said orientation axis, means for producing electromagnetic energy coupled to said antenna system, means receiving energy reflected from remote objects upon which said electromagnetic energy impinges, means for rotating said beam axis about said axis of orientation thereby producing a modulation wave on said received energy whenever said beam axis does not concentrically circumscribe said remote object, means for rendering said receiving means operative at the proper time to receive only those reflections coming from a particular object, means for detecting the modulation wave on said received energy the phase of which is characteristic of the position said remote object occupies relative to said axis of orientation, a two segmented commutator coupled to said beam axis rotating means, means supplying each segment with opposed phases of said detected modulator wave, two pair of brushes associated with said commutator, one pair of said brushes situated in the vertical phase and the other being situated in a horizontal plane, means for moving said antenna orientation axis in azimuth connected to said horizontal pair of brushes, and means for moving said antenna orientation axis in elevation connected to said vertical pair of brushes.

11. Radio direction finding apparatus comprising means to radiate electromagnetic waves, means to receive electromagnetic waves reflected from a remote object, a directive antenna system associated with at least one of said radiating means and receiving means, said antenna system having an axis of directivity and an axis of orientation at an acute angle with said axis of directivity, means to revolve said axis of directivity about said orientation axis, means to alter the direction of said orientation axis, means controlled by the response of said receiving means when the movement of said directivity axis about said orientation axis produces a cyclically varying signal in said receiving means from electromagnetic waves reflected from said remote object to produce an electrical effect dependent on the amplitude of variations of said received waves during said cyclical revolving and on the position of said axis of directivity of said antenna system during each revolution when said received waves are maximum in intensity to control said moving means so as to cause said orientation axis to seek, find, and maintain a direction having a predetermined relation with said object.

12. Direction finding apparatus comprising, a directive receiving antenna system having an orientation axis and an axis of directivity, said axis of directivity being inclined at an acute angle with respect to said orientation axis, means to vary the direction of said orienttaion axis, means to revolve said axis of directivity in a predetermined cyclic manner about said orientation axis so as to scan a selected field of space including said remote object, means responsive to electromagnetic waves received in said antenna system from said remote object to produce an electrical effect dependent on the amplitude of variations of said received waves during said cyclic revolution and on the position of said axis of directivity during the portion of each revolution when said received waves are maximum in intensity, and means to cause said electrical effect to regulate said varying means to cause said orientation axis to seek and maintain an alignment with the direction of propagation of said received waves.

13. Radio direction finding apparatus comprising, means to receive electromagnetic waves from a remote object, a directive antenna system associated with said receiving means and having an axis of directivity and an axis of orientation, means to move said axis of directivity about said orientation axis in a predetermined manner, means responsive to said waves received during the motion of said axis of directivity including a detector to detect said waves, an amplifier to amplify the output of said detector, and a phase sensitive rectifier associated with the output of said amplifier, and means to utilize the response of said responsive means to operate servomotor means to cause said axis of orientation to seek alignment with said object.

14. A radio echo detection system comprising an antenna system having an axis of orientation and a beam directive axis at an acute angle to said orientation axis, means for producing electromagnetic energy coupled to said antenna system, means receiving energy reflected from remote objects upon which said electromagnetic energy impinges, means for rotating said beam axis about said axis of orientation thereby producing a modulation wave on said received energy whenever said beam axis does not concentrically circumscribe said remote object, means for detecting the modulation wave on said received energy, the phase of which is characteristic of the position said remote object comprises relative to said axis of orientation, a range discriminating circuit connected between said receiving means and said detecting means for rendering said receiving means operative at the proper time to receive only those reflections coming from a particular object, means for producing a reference wave in accordance with the rotation rate of said beam axis, a phase measuring circuit comparing the phase of said detected modulation wave with the phase of said reference wave, voltage generating means producing a second voltage determined in sense by the phase difference between said reference wave and said modulation wave, and means operable by said second voltage moving the orientation axis of said antenna to the sense of said second voltage.

15. A radio echo detection system comprising, an antenna system having an axis of orientation and a beam directive axis at an acute angle to said axis, means for producing pulsed electromagnetic energy coupled to said antenna system, means receiving energy reflected from remote objects upon which said electromagnetic energy impinges, means for rotating said beam axis about said axis of orientation thereby producing a modulation wave on said received energy whenever said beam axis does not concentrically circumscribe said remote object, means generating a rectangular voltage pulse during the receipt of each reflected pulse, an electronic switch connected to the output of said receiving means being rendered conducting by the application of said rectangular pulse thereto thereby controlling conduction therethrough of reflected signals coming from a particular selected object, means connected to the output of said electronic switch for detecting the modulation wave on said received energy, the phase of which is characteristic of the position said remote object occupies relative to said axis of orientation, means producing a reference wave in accordance with the rotation rate of said beam axis, a phase measuring circuit comparing the phase of said detected modulation wave with the phase of said reference wave, voltage generating means producing a voltage determined in sense by the phase difference between said reference wave and said modulation wave, and means operable by said voltage moving the orientation axis of said antenna to the sense of said second voltage.

16. A radio echo detection system comprising, an antenna system having an axis of orientation and a beam directive axis at an acute angle to said orientation axis, means producing electromagnetic energy coupled to said antenna system, means receiving energy reflected from remote objects upon which said electromagnetic energy impinges, means rotating said beam axis about said axis of orientation thereby producing a modulation wave on said received energy whenever said beam axis does not concentrically circumscribe said remote object, means detecting the modulation wave on said received energy, the phase of which is characteristic of the position said remote object occupies relative to said axis of orientation, a range discriminating circuit connected between said receiving means and said detecting means rendering said receiving means operative at the proper time to receive only those reflections coming from a particular object, means producing a reference wave in accordance with the rotation rate of said beam axis, a phase measuring circuit comparing the phase of said detected modulation wave, said phase measuring circuit comprising a first transformer, means for applying said reference wave to the primary winding of said first transformer, first and second diodes, the anode of said first diode being connected to one end of the secondary winding of said first transformer and the anode of said second diode being connected to the opposite end of the secondary winding of said first transformer, first and second electron tubes each having at least a control grid, an anode and a cathode, the cathodes of said diodes being respectively connected to the control grids of said first and second electron tubes, a second transformer having a secondary winding serially connected between a center tap of the secondary winding of said first transformer and the cathodes of said electron tubes, means applying said modulation wave to the primary winding of said second transformer, a pair of coils serially connected between the anodes of said first and second electron tubes, the magnitude and direction of the current flow in said coils being determined by the phase difference between said reference wave and said modulation wave, voltage generating means producing a voltage determined in sense and magnitude by the magnitude and direction of the current in said coils, and means operable by the output of said generating means moving the orientation axis of said antenna to reduce the output of said generating means.

17. A radio echo detection system comprising, an antenna system having an axis of orientation and a beam directive axis at an acute angle to said orientation axis, means for producing pulsed electromagnetic energy coupled to said antenna system, means receiving energy reflected from remote objects upon which said electromagnetic energy impinges, means rotating said beam axis about said axis of orientation thereby producing a modulation wave on said received energy whenever said beam axis does not concentrically circumscribe said remote object, means generating a rectangular voltage pulse during the receipt of each reflected pulse, an electronic switch connected to the output of said receiving means being rendered conducting by the application of said rectangular pulse thereto thereby controlling the conduction therethrough of reflected signals coming from a particular selected object, means connected to the output of said electronic switch detecting the modulation wave on said received energy, the phase of which is characteristic of the position said remote object occupies relative to said axis of orientation, means producing a reference wave in accordance with the rotation rate of said beam axis, a phase measuring circuit comparing the phase of said detected modulation wave, said wave measuring circuit comprising a first transformer, means applying said reference wave to the primary winding of said first transformer, first and second diodes, the anode of said first diode being connected to one end of the secondary winding of said first transformer and the anode of said second diode being connected to the opposite end of the secondary winding of said first transformer, first and second electron tubes each having at least a control grid, an anode and a cathode, the cathodes of said diodes being respectively connected to the control grids of said first and second electron tubes, a second transformer having a secondary winding serially connected between a center tap of the secondary winding of said first transformer and the cathodes of said first and second electron tubes, means applying said modulation wave to the primary winding of said second transformer, a pair of coils serially connected between the anodes of said first and second electron tubes, the magnitude and direction of the current flow in said coils being determined by the phase difference between said reference wave and said modulation wave, voltage generating means producing a voltage determined in sense and magnitude by the magnitude and direction of the current in said coils and means operable by the output of said generating means moving the orientation axis of said antenna to reduce the output of said generating means.

LOUIS N. RIDENOUR.

REFERENCES CITED

The following references are of record in the file of this patent:

UNITED STATES PATENTS

| Number | Name | Date |
|---|---|---|
| 2,083,242 | Runge | June 8, 1937 |
| 2,176,469 | Moueix | Oct. 17, 1939 |
| 2,412,612 | Godet | Dec. 17, 1946 |
| 2,416,562 | Alexanderson | Feb. 26, 1947 |
| 2,417,248 | Godet | Mar. 1, 1947 |